(12) United States Patent
Tian et al.

(10) Patent No.: US 7,283,750 B2
(45) Date of Patent: Oct. 16, 2007

(54) SYSTEM AND METHOD FOR SETTING A TUNABLE FILTER IN AN OPTICAL NETWORK

(75) Inventors: Cechan Tian, Plano, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 545 days.

(21) Appl. No.: 10/897,633

(22) Filed: Jul. 23, 2004

(65) Prior Publication Data

US 2006/0018660 A1 Jan. 26, 2006

(51) Int. Cl.
*H04J 14/02* (2006.01)

(52) U.S. Cl. ...................................... 398/85
(58) Field of Classification Search ............... 398/85
See application file for complete search history.

(56) References Cited

U.S. PATENT DOCUMENTS

| | | | | |
|---|---|---|---|---|
| 6,504,616 B1* | 1/2003 | Haber et al. | ................. | 356/519 |
| 6,822,785 B1* | 11/2004 | Chu et al. | ................... | 359/308 |
| 2001/0028494 A1* | 10/2001 | Norwood et al. | ........... | 359/290 |
| 2002/0186434 A1* | 12/2002 | Roorda et al. | ............... | 359/128 |
| 2003/0123789 A1* | 7/2003 | Miyata et al. | ................. | 385/24 |
| 2004/0179840 A1* | 9/2004 | Kai et al. | ..................... | 398/33 |
| 2006/0210276 A1* | 9/2006 | Korn et al. | ................... | 398/85 |

* cited by examiner

*Primary Examiner*—Jason Chan
*Assistant Examiner*—Quan-Zhen Wang
(74) *Attorney, Agent, or Firm*—Baker Botts L.L.P.

(57) ABSTRACT

A method and a system for setting a tunable filter in an optical network are provided. In one embodiment, a method for setting a tunable filter in an optical network includes rejecting a reference wavelength using a fixed filter from an input optical signal to generate a passthrough optical signal. A tunable filter is adjusted to maintain the tunable filter at the reference wavelength. The tunable filter is adjusted to a selected wavelength based on a determination of the reference wavelength.

23 Claims, 3 Drawing Sheets

SYSTEM AND METHOD FOR SETTING A TUNABLE FILTER IN AN OPTICAL NETWORK

TECHNICAL FIELD

The present invention relates generally to optical networks and, more particularly, to a system and method for setting a tunable filter in optical network.

BACKGROUND

Telecommunications systems, cable television systems and data communication networks use optical networks to rapidly convey large amounts of information between remote points. In an optical network, information is conveyed in the form of optical signals through optical fibers. Optical fibers are thin strands of glass capable of transmitting the signals over long distances with very low loss.

Optical networks often employ wavelength division multiplexing (WDM) to increase transmission capacity. In a WDM network, a number of optical channels are carried in each fiber at disparate wavelengths. Network capacity is increased as a multiple of the number of wavelengths, or channels, in each fiber.

In order to process encoded data, individual optical channels must be dropped or removed from the WDM signal for individual processing. Tunable filters provide one means of passing an individual channel while rejecting the other channels in a WDM signal. However, tunable filters may drift due to environmental instabilities resulting in inaccurate tuning.

SUMMARY

A method and a system for setting a tunable filter in an optical network are provided. In one embodiment, a method for setting a tunable filter in an optical network includes rejecting a reference wavelength using a fixed filter from an input optical signal to generate a passthrough optical signal. A tunable filter is adjusted to maintain the tunable filter at the reference wavelength. The tunable filter is adjusted to a selected wavelength based on a determination of the reference wavelength.

Technical advantages of certain embodiments of the present invention include an improved technique for tuning a tunable filter relative to a reference wavelength. Other advantages of one or more embodiments may include providing a stable rejection type filter to generate the reference wavelength and to thus provide greater accuracy in setting and maintaining a tunable filter at a desired wavelength. One or more embodiments may also have the advantage of reducing, minimizing, or eliminating a tunable filter's susceptibility to environmental instability.

It will be understood that the various embodiments of the present invention may include some, all, or none of the enumerated technical advantages. In addition other technical advantages of the present invention may be readily apparent to one skilled in the art from the figures, description, and claims included herein.

DETAILED DESCRIPTION OF THE DRAWINGS

Figure 1:
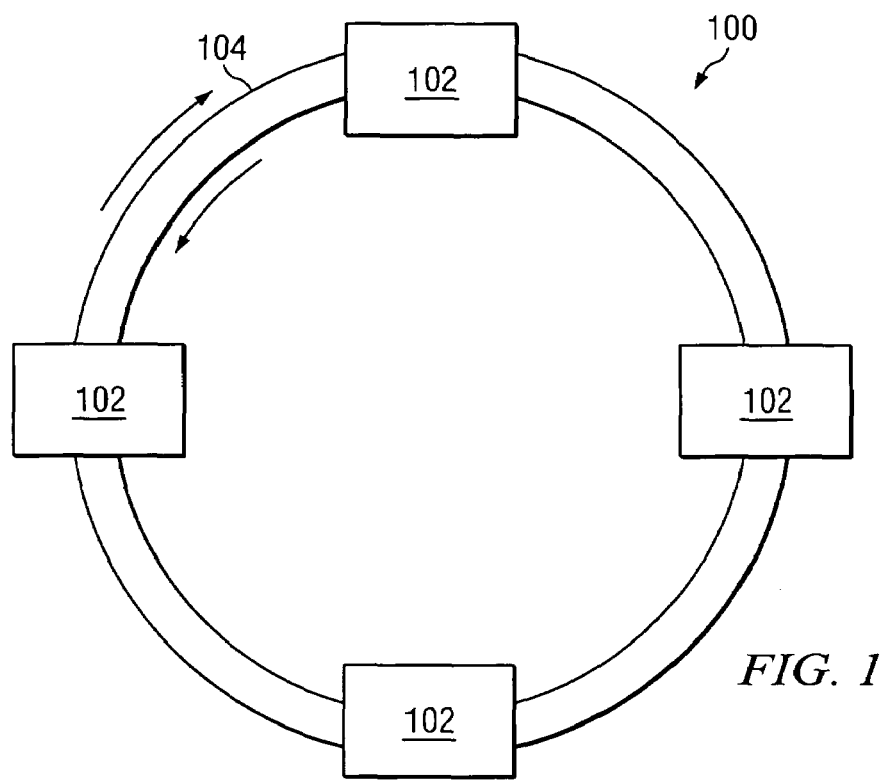
FIG. 1 is a block diagram illustrating an optical network in accordance with one embodiment of the present invention.

FIG. 1 illustrates an optical network 100 in accordance with one embodiment of the present invention. In this embodiment, the network 100 is an optical network in which a number of optical channels are carried over a common path at disparate wavelengths. The network 100 may be a wavelength division multiplexing (WDM), dense wavelength division multiplexing (DWDM), or other suitable multichannel network. The network 100 may be used in a short-haul metropolitan network, a long-haul inter-city network, or any other suitable network or combination of networks.

Network 100 includes a plurality of add/drop nodes (ADNs) 102, a first fiber optic ring 104, and a second fiber optic ring 106. Optical information signals are transmitted in different directions on the rings 104 and 106 to provide fault tolerance. "Optical signals", as used herein, include channels that are associated with a particular wavelength or a band of wavelengths and that carry traffic in network 100. As used herein, "traffic" means information transmitted, stored, or sorted in network 100. The rings 104 and 106 optically connect ADNs 102, wherein each ADN can both transmit traffic to and receive traffic from the other ADNs. As used herein, the term "each" means every one of at least a subset of the identified items. Optical signals transmitted in network 100 may have at least one characteristic modulated to encode audio, video, textual, real-time, non-real-time and/or other suitable data. Modulation may be based on phase shift keying (PSK), intensity modulation (IM) and other suitable methodologies. Although FIG. 1 illustrates a dual-ring network, embodiments of the invention may be used in any appropriate type of ring network or other type of optical network and may be implemented in any suitable device in such networks.

In the illustrated embodiment, the first ring 104 is a clockwise ring in which traffic is transmitted in a clockwise direction. The second ring 106 is a counterclockwise ring in which traffic is transmitted in a counterclockwise direction. The nodes 102 are each operable to add and drop traffic to and from the rings 104 and 106. In particular, each node 102 receives traffic from local clients and adds that traffic to the rings 104 and 106. At the same time, each node 102 receives traffic from the rings 104 and 106 and drops traffic destined associated local clients. In adding and dropping traffic, the nodes 102 may multiplex data from local clients for transmittal in the rings 104 and 106 and may demultiplex channels of data from the rings 104 and 106 for clients. In those embodiments, nodes 102 may also perform optical-to-electrical conversion of the signals received from and sent to the local clients.

Figure 2:
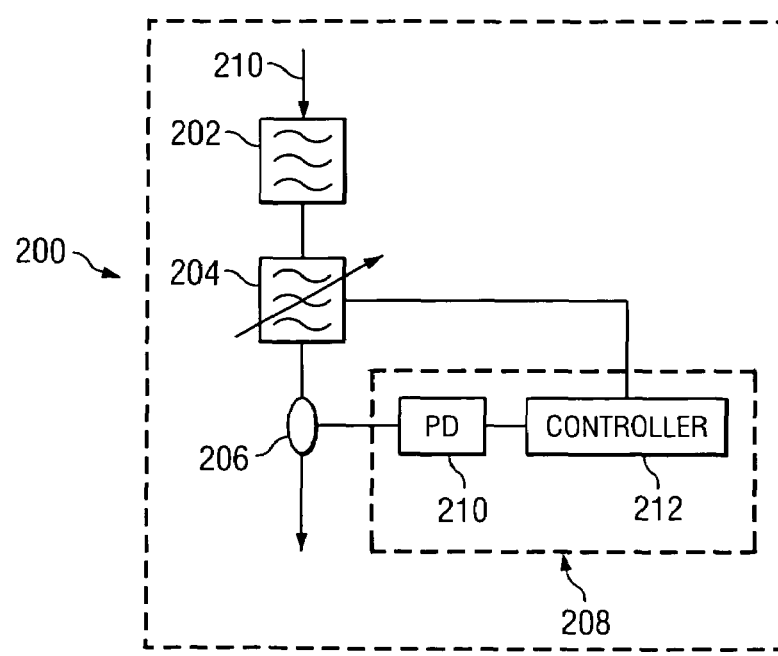
FIG. 2 is a block diagram illustrating tuning element in accordance with one embodiment of the present invention.

FIG. 2 illustrates one embodiment of a tuning element 200 for tuning a tunable filter 204 relative to a reference wavelength. Tuning element 200 may be used in any suitable optical system such as in nodes 102 of optical network 100 of FIG. 1. Alternatively, tuning element 200 may be used with any suitable optical system that includes a tunable optical filter. Tuning element 200 may in other embodiments be combined in whole or in part with a waveguide circuit and/or free space optics.

Referring to FIG. 2, tuning element 200 includes a fixed filter 202, a tunable filter 204, an optical coupler 206, and a feedback element 208. Fixed filter 202 is coupled to optical fiber 210 and operable to receive an input optical signal including a plurality of channels, with each channel having an associated wavelength. Fixed filter 202 is configured to substantially reject noise accumulation in the input optical signal at a particular reference wavelength (at which no traffic is carried) and to pass traffic (and noise accumulation) carried at other wavelengths of the signal. For example, fixed filter 202 may reject a wavelength at which only background noise such as amplified spontaneous emissions (ASE) and other noise accumulation is carried. As described below, the lack of noise accumulation at the reference wavelength due to this filtering is used to identify the reference wavelength at which fixed filter 202 operates (relative to other wavelengths in the vicinity of the reference wavelength that have the noise accumulation and potentially optical traffic). Alternatively, in passive optical networks or other networks not having noise accumulation, ASE or another suitable signal may be added at least in the vicinity of the reference wavelength for this purpose.

In one embodiment, the fixed optical filter 202 comprises a fiber Bragg grating (FBG). Fixed filter 202 may alternatively comprise other suitable filters for passively rejecting a reference wavelength from an input optical signal such as, for example, a thin film filter (TFF). "Passive" in this context means without power, electricity, and/or moving parts. An "active" device would thus use power, electricity or moving parts to perform work. The term "reject", as used herein, may mean dropping, terminating, or otherwise removing traffic from the input optical signal from fiber 210. Fixed filter 202 may comprise a single filter or a plurality of filters connected serially, parallel, or otherwise that rejects the reference wavelength and passes the remaining traffic to tunable filter 204.

Tunable filter 204 is coupled to fixed filter 202 and optical coupler 206 and receives traffic from fixed filter 202. Tunable filter 204 passes a selected (or reference) wavelength to optical coupler 206 while substantially rejecting other wavelengths. More particularly, tunable filter 204 passes a narrow band centered around the selected (or reference) wavelength and thus the phrase "selected wavelength" (or "reference wavelength") also refers to the additional wavelengths in the narrow band, where appropriate. Additionally, tunable filter 204 is operable to receive control signals from feedback element 208 for either maintaining tunable filter 204 at a selected (or reference) wavelength or adjusting tunable filter 204 to a selected wavelength from a different wavelength. While maintaining tunable filter 204 at a selected (or reference) wavelength, tunable filter 204 may dither around the wavelength to always detect the maximum (or minimum) power level to counteract any drift in tunable filter 204 due to environmental instability. Tunable filter 204 may comprise any suitable active filter operable to be pass a selected wavelength while substantially rejecting other wavelengths such as, for example, a Fabry-Perot tunable filter, acousto-optical tunable filter, or other suitable filters. A Fabry-Perot filter is tuned to a selected (or reference) wavelength by applying suitable voltages. Acousto-optical tunable filters are tuned to a selected (or reference) wavelength by applying suitable radio frequencies. In short, tunable filter 204 may comprise any suitable filter that substantially rejects other wavelengths except a selected wavelength and passes the selected wavelength to optical coupler 206.

Optical coupler 206 is operable to split the optical signal received from tunable filter 204 into a feedback signal and a passthrough signal, which are two substantially identical signals. As used herein, an optical coupler is any device operable to combine or otherwise generate a combined optical signal based on two or more optical signals and/or to split or divide an optical signal into discrete optical signals. The discrete signals may be similar or identical in frequency, form, and/or content. For example, the discrete signals may be identical in content and identical or substantially similar in power, may be identical in content and differ substantially in power, or may differ slightly or otherwise in content. Any other suitable optical devices that passively splits an input signal into two substantially identical signals may be used in place of optical coupler 206. The passthrough signal comprises an egress optical signal while the feedback signal is dropped to feedback element 208.

Feedback element 208 generates control signals based on the feedback signal for maintaining tunable filter 204 at a selected (or reference) wavelength and/or for adjusting tunable filter 204 relative to the reference wavelength. In regards to adjusting tunable filter 204, feedback element 208 tunes tunable filter 204 to a selected wavelength relative to another wavelength (e.g., the reference wavelength) based on their spectral separation. Once adjusted to a selected wavelength, feedback element 208 determines a maximum power level associated with the selected wavelength for maintaining tunable filter 204 at the selected wavelength. In contrast, feedback element 208 determines a minimum power level associated with the reference wavelength for maintaining tunable filter 204 at the reference wavelength. In one embodiment, feedback element 208 performs optical-to-electrical conversion of the feedback signal to determine the power levels associated with one or more wavelengths of the optical signal. Based on the power levels, feedback element 208 monitors a maximum (or minimum) power level associated with the selected (or reference) wavelength and continually adjusts tunable filter 204 to the maximum (or minimum) power level for maintaining tunable filter 204 at the selected (or reference) wavelength. As mentioned above, tunable filter 204 may dither around the selected (or reference) wavelength to counteract any environmental instability. In the illustrated embodiment, feedback element 208 includes a photodiode 210 and a controller 212. Photodiode 210 receives the feedback signal from coupler 206 and performs optical-to-electrical conversion of the feedback signal. Feedback element 208 may alternatively comprise any other suitable device such as, for example, a bipolar phototransistor, a photoFET, or any other suitable device that can perform optical-to-electrical conversion of the feedback signal and pass the electrical signal to controller 212.

Controller 212 generates control signals based on power levels of the associated feedback signal and/or spectral separation between two wavelengths and may comprise logic stored in media. The logic comprises functional instructions for carrying out program tasks. The media may comprise application specific integrated circuits (ASIC), field programmable gate arrays (FPGA), digital signal processors (DSP), or other suitable specific or general purpose processors, transmission media, or other suitable media in which logic may be encoded and utilized. In the case that tunable filter 204 is tuned to the reference wavelength, controller 212 determines a minimum power level associated with the reference wavelength rejected by fixed filter 202 and generates control signals for substantially maintaining tunable filter 204 in a standby state at the reference wavelength. More particularly, controller 212 monitors a minimum power level of the narrow band passed by tunable filter 204 and adjusts tunable filter 204 to maintain the center of the narrow band at the minimum power level, i.e., the reference wavelength. As discussed above, tunable filter 204 passes a narrow band centered around a selected (or reference) wavelength. In the case that tunable filter 204 is tuned to a selected wavelength, controller 212 determines a maximum power level associated with the selected wavelength and generates control signals for substantially maintaining tunable filter 204 in an active state at the selected wavelength. More particularly, controller 212 monitors the maximum power level of the narrow band and adjusts tunable filter 204 to maintain the center of the narrow band at the maximum power level, i.e., the selected wavelength. As discussed above, the control signals may comprise a voltage, a radio frequency, or any other suitable signal for adjusting tunable filter 204. Since tunable filter 204 may drift from the set wavelength due to environmental instability (e.g., temperature), the generated control signals may result in tunable filter 204 dithering around the referenced wavelength to counteract this drift.

In the case that a wavelength is selected that is different from the reference wavelength (i.e., tunable filter 204 is moved from the standby state to an active state), controller 212 generates, based on a predetermined function, control signals for adjusting, relative to the reference wavelength, tunable filter 204 to the selected wavelength. The predetermined function may comprise any suitable mathematical and/or logical expression such that controller 212 is operable to perform relative tuning of tunable filter 204. In one embodiment, the predetermined function gives an appropriate control parameter (e.g., voltage, radio frequency, etc.) based on a spectral separation between the reference and selected wavelength. Once adjusted to the selected (or reference) wavelength, controller 212 maintains tunable filter 204 at the selected (or reference) wavelength as discussed above. In the event that tunable filter 204 is to be returned to the standby state, controller 212 may scan tunable filter 204 over the wavelengths associated with optical network 100 to determine a minimum power level, which is associated with the reference wavelength. For example, controller 212 may determine a minimum power level of the feedback signal and associate the reference wavelength with the identified minimum. In this case, controller 212 generates control signals relative to the selected wavelength to return the tunable filter 204 to the reference wavelength.

In one aspect of operation, fixed filter 202 receives an input optical signal including multiple channels via optical fiber 210 and passively rejects noise accumulation or other signals at a reference wavelength from the input signal while passing the remaining traffic to tunable filter 204. Tunable filter 204 passes the reference wavelength to optical coupler 206 while substantially rejecting other wavelengths. Optical coupler 206 splits the remaining signal into a passthrough signal and a feedback signal. The feedback signal is dropped to photodiode 210 which performs optical-to-electrical conversion of the feedback signal. Controller 212 receives the electrical signal and determines a minimum power level associated with the reference wavelength (due to the rejection of the noise accumulation at the reference wavelength). Based on this power level, controller generates a control signals for maintaining tunable filter 204 at the reference wavelength. If a wavelength is selected different from the reference wavelength, controller 212 determines a control signal for adjusting tunable filter 204 relative to the reference wavelength using a predetermined function based on a spectral separation between the reference wavelength and the selected wavelength. Once appropriate control parameters are determined for adjusting tunable filter 204 to the different selected wavelength, controller 212 adjusts tunable filter 204 to the selected wavelength. The feedback process discussed above repeats itself to maintain tunable filter 204 at the selected wavelength and is based instead on a maximum power level associated with the selected wavelength. In the event that tunable filter 204 is to return to a standby state, controller 212 scans tunable filter 204 over the wavelengths of optical network 100 to determine the minimum power level associated with the reference wavelength. Based on this determination, controller 212 adjusts tunable filter 204 to the reference wavelength. Alternatively, tunable filter 204 may be adjusted to a newly selected wavelength based on the spectral separation between the newly selected wavelength and the selected wavelength.

Figure 3:
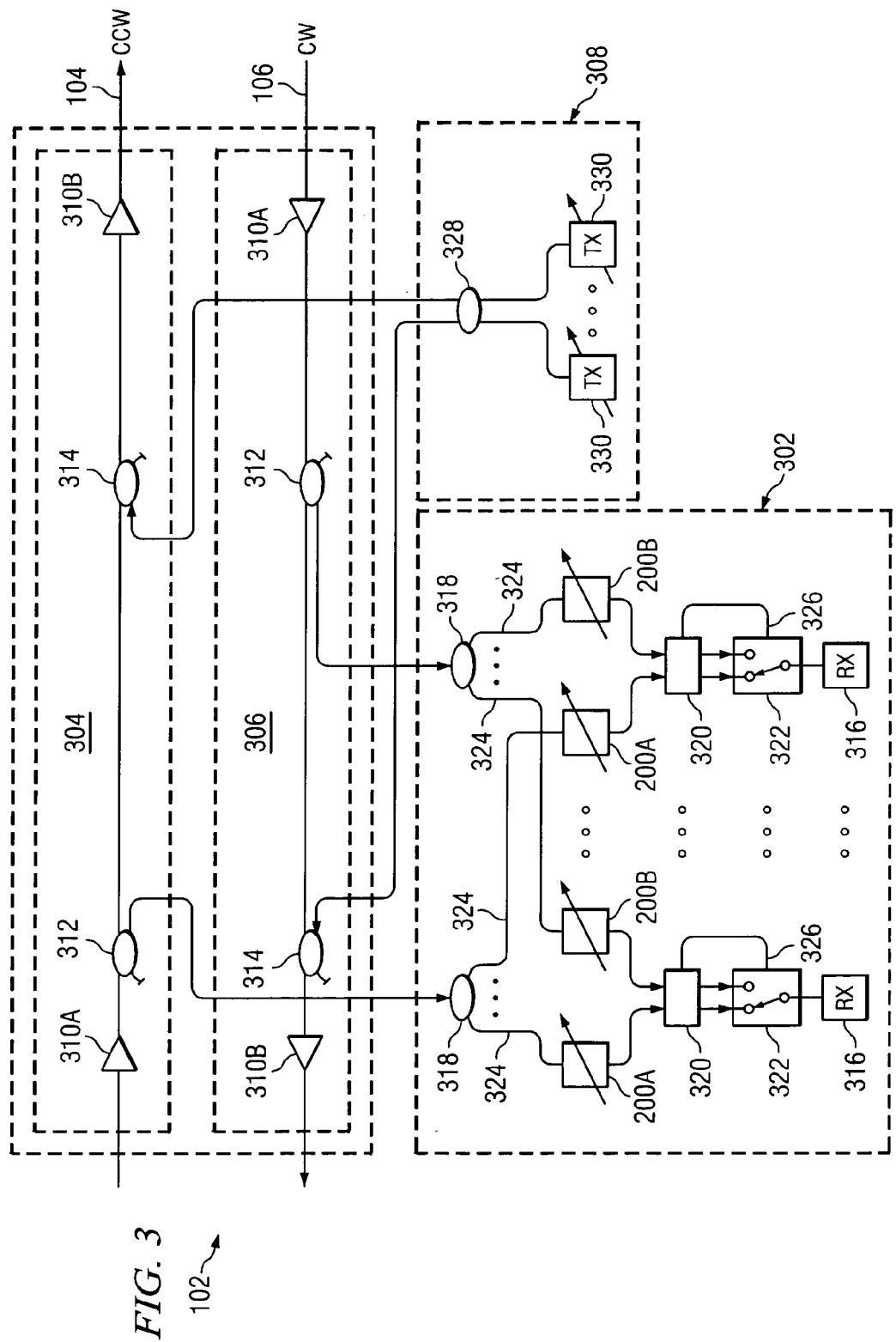
FIG. 3 is a block diagram illustrating an example add/drop node including the tuning element of FIG. 2.

FIG. 3 illustrates one embodiment of an add/drop node 102 incorporating tuning element 200. In the illustrated node 102, traffic is passively dropped from fiber 104 and 106. In particular, the illustrated embodiment uses couplers 312 and 314 and a receiving element 302 to extract traffic in one or more wavelengths assigned to node 102 from an optical signal carried on rings 104 and/or 106. Receiving element 302 comprises tuning elements 200A and 200B for providing this particular wavelength(s) from the multi-channel optical signal received at node 102. FIG. 3 merely is intended to illustrate one possible use of tuning element 200. As discussed above, tuning element 200 may be used in any suitable optical system that uses a tunable filter.

Referring to FIG. 3, node 102 comprises a first, or counterclockwise transport element 304, a second, or clockwise transport element 306. Node 102 may comprise transmitting element 308 and receiving element 302. Transport elements 304 and 306 add and drop traffic to and from the fibers 104 and 106 and/or provide other interaction of node 102 with fibers 104 and 106. Transmitting element 308 generates local add signals to be added to fibers 104 and 106 by transport elements 304 and 306. Receiving element 302 receives local drop signals dropped from fibers 104 and 106 by transport elements 304 and 306. In particular embodiments, transport, transmitting, and receiving elements 302, 304, 306, and 308 may each be implemented as a discrete card and interconnected through a backplane of a card shelf of the node 102. Alternatively, the functionality of one or more elements 302, 304, 306, and 308 may be distributed across a plurality of discrete cards. The components of node 102 may be coupled by direct, indirect or other suitable connection or association. In the illustrated embodiment, elements 302, 304, 306, and 308 and devices in the elements are connected with optical fiber connections, however, other embodiments may be implemented in part or otherwise with planar waveguide circuits and/or free space optics.

In one embodiment, transport elements 304 and 306 each comprise amplifiers 310, a drop coupler 312, and an add coupler 314. Amplifiers 310 amplify the optical signals. Drop coupler 312 is operable to split an incoming optical signal into a drop signal and a passthrough signal, wherein both signals are substantially the same. In addition, transport elements 304 and 306 each comprise an add coupler 314 operable to add/combine the passthrough signal and the signals generated by the transmitting element 308.

Amplifiers 310 may be EDFAs or other suitable amplifiers capable of receiving and amplifying an optical signal. To reduce the optical power variations of the clockwise ring 106 and of the counterclockwise ring 104, amplifiers 310 may use an automatic level control (ALC) function with wide input dynamic-range. Hence amplifiers 310 may deploy automatic gain control (AGC) to realize gain-flatness against input power variation, as well as variable optical attenuators (VOAs) to realize ALC function.

During operation of node 102, amplifier 310 of each transport element 304 and 306 receives a signal from the connected fiber 104 or 106 and amplifies the signal. The amplified signal is forwarded to drop coupler 312. Drop coupler 312 splits the signal into a passthrough signal and a drop signal. The passthrough signal is forwarded to add coupler 314. The local drop signal is forwarded from drop coupler 312 to receiving element 302, which selectively passes traffic in the selected wavelengths of the drop signal to one or more receivers 316. Add coupler 314 combines the passthrough signal and signals generated by transmitting element 308.

In the illustrated embodiment, the receiving element includes two 1×n couplers 318, tuning elements 200, a plurality of selectors 320, a plurality of 2×1 switches 322, and a plurality of receivers 316. 1×n couplers 318 may comprise one optical fiber input lead and a plurality of optical fiber output leads which serve as drop leads 324. Each drop lead 324 may be connected to a tuning element 200 operable to pass a selected wavelength and reject other wavelengths and operable to maintain a tunable filter at a selected wavelength in light of environmental instability. The selected wavelengths from tuning element 200A and 200B are passed to an associated selector 320 and switch 322, which allows selective connection of an associated receiver 316 with either an associated drop signal coming from ring 104 or an associated drop signal coming from ring 106. Such selective switching may be used to implement Optical Unidirectional Path-Switched Ring (OUPSR) protection switching. In a particular embodiment, selector 320 is initially configured to forward to the local client(s) traffic from a fiber 104 or 106 that has the lower bit error rate (BER). A threshold value is established such that the switch remains in its initial state as long as the BER does not exceed the threshold. Another threshold or range may be established for power levels. For example, if the BER exceeds the BER threshold or if the power falls above or below the preferred power range, the switch selects the other signal. Commands for switching may be transmitted via connection 326.

In the illustrated embodiment, transmitting element 308 comprises a 2×n coupler 328 and a plurality of tunable transmitters 330 that transmit traffic at a set of wavelengths assigned to node 102. 2×n coupler 328 comprises a plurality of leads which serve as add leads and may be connected to the plurality of tunable transmitters 330. Tunable transmitters 330 are operable to transmit add signals at selected wavelengths and thus provide flexible assignment of wavelengths to node 102. Coupler 328 combines the signals received from transmitters 330 into an add signal and splits the add signal into two substantially similar signals, wherein one signal is added to fiber 104 and the other signal is added to fiber 106. The add signals are forwarded to add couplers 314 for addition to the associated fiber 104 or 106, as described above. Each add coupler 314 receives the add signal and combines the passthrough signal with the add signal.

In the illustrated embodiment, the same or substantially the same signals are communicated over both fibers 104 and 106. Therefore, a single set of receivers 316 may be used to receive signals from fibers 104 or 106 (one or the other are received, depending on the position of switch 322 and selector 320), the same set of transmitters 330 may be used to transmit the same signals to both fibers 104 and 106. Such a configuration is appropriate when providing OUPSR protection. However, in other embodiments, node 102 may include a separate set of receivers 316 associated with each of fibers 104 and 106, and a separate set of transmitters 330 associated with each of fibers 104 and 106. In this case, no switch 322 and selector 320 are needed. Instead, the drop signals associated with each fiber 104 or 106 are coupled to the set of receivers 316 associated with each ring. Therefore, different signals may be received from fibers 104 and 106.

Similarly, instead of splitting the signal from a set of transmitters 330 using a coupler 328 and providing this signal to both fibers 104 and 106, a different signal may be generated by the set of transmitters 330 associated with fiber 106 and the set of transmitters 330 associated with fiber 104. Therefore, different signals may be communicated over each fiber 104 and 106. For example, a first signal can be added in a particular channel on fiber 106 at node 102, and an entirely different signal can be added in the same channel on fiber 104 by the same node 102.

Figure 4:
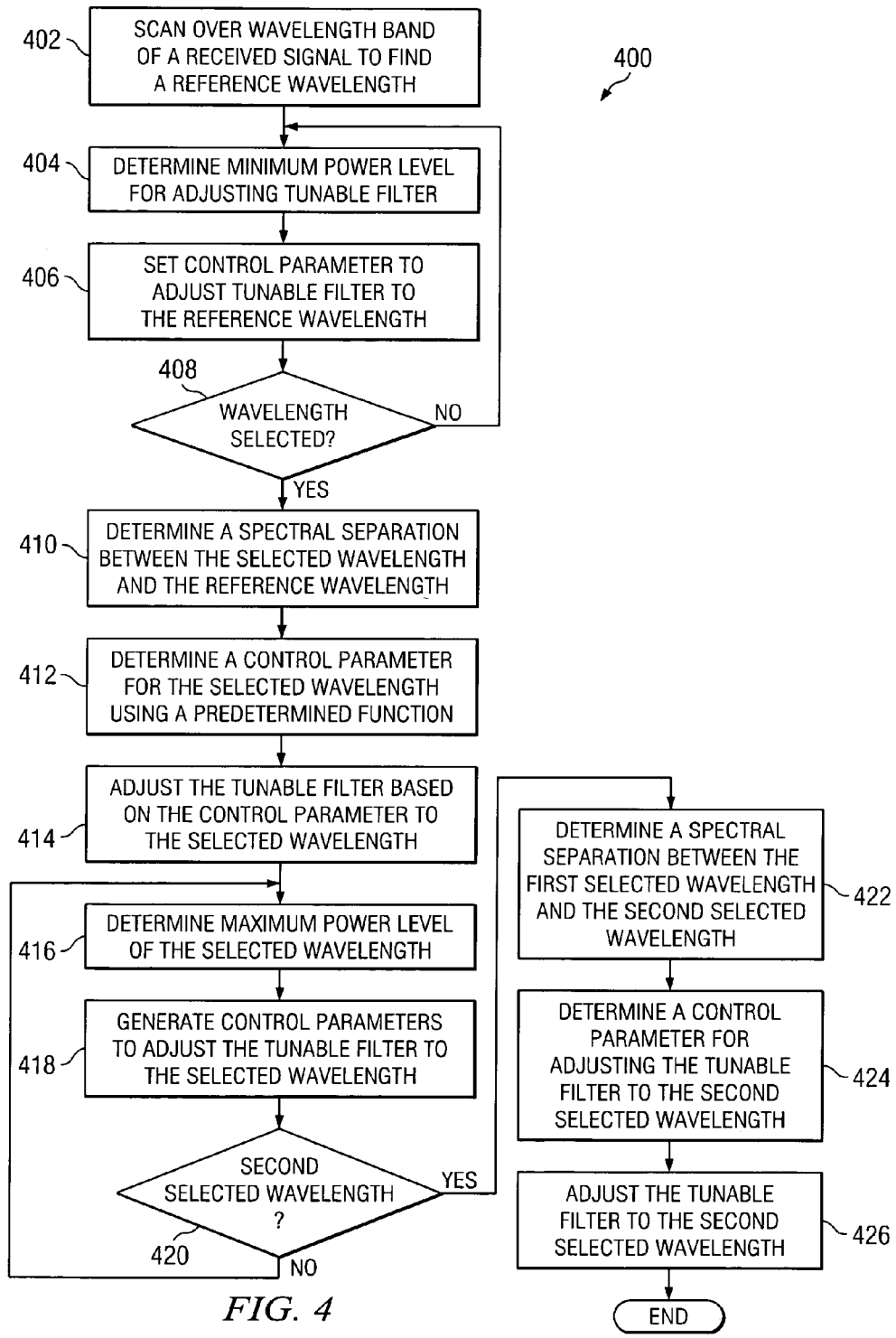
FIG. 4 illustrates an example flow diagram for adjusting a tunable filter.

FIG. 4 is an example flow diagram illustrating a method 400 for adjusting a tunable filter in an optical network. The method begins at step 402 where feedback element 208 scans tunable filter 204 over the wavelength band of a received optical signal to find the reference wavelength rejected by fixed filter 202. At step 404, controller 212 determines a minimum power level of the received optical signal to identify the reference wavelength (based on the rejection of the noise accumulation or other signal at the reference wavelength). Next, at step 406, controller 212 determines control parameters for adjusting tunable filter 204 to the reference wavelength. If a wavelength to be filtered by tunable filter 204 is not selected at decisional step 408, then execution returns to step 404. In repeating these steps, tunable filter 204 may dither around the reference wavelength to counteract environmental instability. If a wavelength to be filtered is selected at decisional step 406, then, at step 410, controller 212 determines a spectral separation between the selected wavelength and the reference wavelength. Control parameters for adjusting the tunable filter 204 relative to the reference wavelength are determined using a predetermined function at step 412. Based on these control parameters, tunable filter 204 is adjusted to the selected wavelength at step 414.

Next, at step 416, controller 212 determines a maximum power level associated with the selected wavelength for use as a reference point. Based on this determination, control parameters are generated by controller 212 for substantially maintaining tunable filter 204 at the selected wavelength. If a second selected wavelength is not selected at decisional step 420, then execution returns to step 416. If a second selected wavelength is selected at decisional step 420, then, at step 422, controller 212 determines a spectral separation between the first selected wavelength and the second selected wavelength. Next, at step 424, control parameters for adjusting the tunable filter 204 relative to the first selected wavelength are determined. Tunable filter 204 at step 426, is adjusted to the second selected wavelength. The processes of adjusting tunable filter 204 to and maintaining tunable filter 204 at a selected wavelength can continue indefinitely using the steps described above. Additionally, if tunable filter 204 is turned off or otherwise reset, then method 400 starts from step 402.

Method 400 is described with respect to tuning element 200 of FIG. 2, but method 400 could also be used by any other system. Moreover, tuning element 200 may use any other suitable techniques for performing these tasks. Thus, many of the steps in this flow chart may take place simultaneously and/or in different orders as shown. Moreover, tuning element 200 may use methods with additional steps, fewer steps, and/or different steps, so long as the methods remain appropriate.

Although the present invention has been described in detail, various changes and modifications may be suggested to one skilled in the art. It is intended that the present invention encompass such changes and modifications as falling within the scope of the appended claims.

What is claimed is:

1. A filtering system, comprising:
   a fixed filter operable to reject accumulated noise at a reference wavelength from an input optical signal to generate a passthrough optical signal;
   a tunable filter operable to pass traffic at a selected wavelength of the passthrough optical signal and to be adjusted by one or more control parameters; and
   a controller operable to adjust the tunable filter to identify the reference wavelength and to generate the one or more control parameters for adjusting the tunable filter to the selected wavelength based on the identification of the reference wavelength.

2. The system of claim 1, wherein the controller is further operable to determine a power level associated with the reference wavelength and generate control parameters for maintaining the tunable filter in a standby state at the reference wavelength.

3. The system of claim 1, wherein the controller is further operable to determine control parameters for adjusting the tunable filter to the selected wavelength based, at least in part, on a spectral separation between the reference wavelength and the selected wavelength.

4. The system of claim 3, wherein the control parameters are determined by a predetermined function based on the spectral separation.

5. The system of claim 1, wherein the fixed filter comprises either a thin film filter or fiber Bragg grating.

6. The system of claim 1, wherein the tunable filter comprises a Fabry-Perot tunable filter and the control parameters comprise a voltage.

7. The system of claim 1, wherein the tunable filter comprises an acousto-optic tunable filter and the control parameters comprise a radio frequency.

8. The system of claim 1, wherein the controller is further operable to determine power levels associated with the selected wavelength and generate control parameters for maintaining the tunable filter in an active state at the selected wavelength.

9. The system of claim 8, wherein the selected wavelength is a first selected wavelength and wherein the controller is further operable to determine control parameters for adjusting the tunable filter to a second selected wavelength based at least in part on a spectral separation between the first selected wavelength and the second selected wavelength.

10. A method of filtering, comprising:
    rejecting accumulated noise at a reference wavelength using a fixed filter from an input optical signal to generate a passthrough optical signal;
    adjusting a tunable filter to identify the reference wavelength; and
    after identifying the reference wavelength, adjusting the tunable filter to a selected wavelength based on the identification of the reference wavelength.

11. The method of claim 10, wherein adjusting a tunable filter to maintain the tunable filter at the reference wavelength comprises:
    determining a power level associated with the reference wavelength; and
    generating control parameters for maintaining the tunable filter in a standby state at the rejected wavelength.

12. The method of claim 10, wherein the tunable filter is adjusted to the selected wavelength with control parameters based at least in part on a spectral separation between the reference wavelength and the selected wavelength.

13. The method of claim 12, wherein the control parameters are determined by a predetermined function based on the spectral separation.

14. The method of claim 10, wherein the reference wavelength is rejected by a fixed filter.

15. The method of claim 10, wherein the fixed filter comprises either a thin film filter or fiber Bragg grating.

16. The method of claim 10, wherein the tunable filter comprises a Fabry-Perot tunable filter and the control parameters comprise a voltage.

17. The method of claim 10, wherein the tunable filter comprises an acousto-optic tunable filter and the control parameters comprise a radio frequency.

18. The method of claim 10, further comprising:
    determining a power level associated with the selected wavelength; and
    generating control parameters for maintaining the tunable filter in an active state at the selected wavelength.

19. The method of claim 18, wherein the selected wavelength is a first selected wavelength, further comprising determining control parameters for adjusting the tunable filter to a second selected wavelength based at least in part on a spectral separation between the first selected wavelength and the second selected wavelength.

20. A system for filtering traffic, comprising:
    means for rejecting accumulated noise at a reference wavelength using a fixed filter from an input optical signal to generate a passthrough optical signal;
    means for adjusting a tunable filter to identify the reference wavelength; and
    means for adjusting the tunable filter to a selected wavelength based on the identification of the reference wavelength.

21. The system of claim 20, further comprising:
    means for determining a power level associated with the selected wavelength; and
    means for generating control parameters for maintaining the tunable filter in a standby state at the selected wavelength.

22. The system of claim 21, the selected wavelength is a first selected wavelength, further comprising means for determining control parameters for adjusting the tunable filter to a second selected wavelength based at least in part on a spectral separation between the first selected wavelength and the second selected wavelength.

23. A method for filtering traffic, comprising:
    passively rejecting accumulated noise at a reference wavelength from an input signal to generate a passthrough signal;
    determining power levels associated with the rejected wavelength;
    generating first control parameters for adjusting a tunable filter at a minimum power level of the rejected wavelength to identify the reference wavelength;
    after identifying the reference wavelength, adjusting the tunable filter with second control parameters to a selected wavelength based at least in part on a separation between the reference wavelength and the selected wavelength, wherein the second control parameters are determined by a predetermined function for determining the separation relative to the reference wavelength;
    determining power levels associated with the selected wavelength; and
    generating control parameters for maintaining the tunable filter at a maximum power level of the selected wavelength.

* * * * *